(12) United States Patent
Shindo

(10) Patent No.: US 12,249,931 B2
(45) Date of Patent: Mar. 11, 2025

(54) CONTROL APPARATUS FOR VIBRATION TYPE MOTOR, AND DRIVING APPARATUS

(71) Applicant: CANON KABUSHIKI KAISHA, Tokyo (JP)

(72) Inventor: Hirotaka Shindo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 894 days.

(21) Appl. No.: 17/444,091

(22) Filed: Jul. 30, 2021

(65) Prior Publication Data

US 2022/0045629 A1 Feb. 10, 2022

(30) Foreign Application Priority Data

Aug. 4, 2020 (JP) .................................. 2020-132101

(51) Int. Cl.
*H02N 2/00* (2006.01)
*H04N 23/68* (2023.01)

(52) U.S. Cl.
CPC ......... *H02N 2/0075* (2013.01); *H04N 23/687* (2023.01)

(58) Field of Classification Search
CPC ............................. H04N 23/687; H02P 25/032
See application file for complete search history.

(56) References Cited

U.S. PATENT DOCUMENTS

| | | | | |
|---|---|---|---|---|
| 6,577,042 B2* | 6/2003 | Lee | ...... | B06B 1/0261 |
| | | | | 310/317 |
| 7,538,473 B2* | 5/2009 | Blandino | ...... | H10N 30/802 |
| | | | | 310/317 |
| 7,701,116 B2* | 4/2010 | Atsuta | ...... | H02N 2/026 |
| | | | | 310/317 |
| 7,834,515 B2* | 11/2010 | Tanimura | ...... | H02N 2/145 |
| | | | | 310/317 |
| 8,450,905 B2* | 5/2013 | Guidarelli | ...... | H02N 2/0095 |
| | | | | 310/317 |
| 8,698,374 B2* | 4/2014 | Xu | ...... | H02N 2/0095 |
| | | | | 310/317 |
| 9,318,980 B2* | 4/2016 | Urano | ...... | B25J 15/00 |
| 2005/0006792 A1* | 1/2005 | Miyata | ...... | H01L 22/20 |
| | | | | 257/E21.525 |
| 2008/0129145 A1* | 6/2008 | Lee | ...... | H02N 2/008 |
| | | | | 310/317 |
| 2009/0009109 A1* | 1/2009 | Hashimoto | ...... | H02N 2/142 |
| | | | | 318/116 |
| 2016/0313445 A1* | 10/2016 | Bailey | ...... | G01S 17/88 |

FOREIGN PATENT DOCUMENTS

| | | |
|---|---|---|
| JP | H09271174 A | 10/1997 |
| JP | 2000-070851 A | 3/2000 |
| JP | 2000-184759 A | 6/2000 |
| JP | 2016-218349 A | 12/2016 |
| JP | 2017-060279 A | 3/2017 |
| JP | 2017143602 A | 8/2017 |
| JP | 2018133873 A | 8/2018 |

* cited by examiner

*Primary Examiner* — Rina I Duda
(74) *Attorney, Agent, or Firm* — Cowan, Liebowitz & Latman, P.C.

(57) ABSTRACT

A control apparatus for a vibration type motor includes a processor or circuit that serves as a driving signal generating unit configured to generate a driving signal of the vibration type motor; and a booster circuit configured to boost the driving signal. The driving signal generating unit changes a duty ratio of the driving signal based on a driving frequency of the vibration type motor or a current flowing through the vibration type motor.

14 Claims, 10 Drawing Sheets

| DRIVING FREQUENCY [kHz] | DUTY RATIO [%] |
|---|---|
| 85 | 32.30 |
| 86 | 32.68 |
| 87 | 33.06 |
| 88 | 33.44 |
| 89 | 33.82 |
| 90 | 34.20 |
| 91 | 34.58 |
| 92 | 34.96 |
| 93 | 35.34 |
| 94 | 35.72 |
| 95 | 36.10 |

FIG. 6

EXAMPLE OF CURRENT WAVELENGTH AT
92 kHz and 34.96 %

EXAMPLE OF CURRENT WAVELENGTH AT
88 kHz and 33.44 %

EXAMPLE OF CURRENT WAVELENGTH AT
88 kHz and 34.96 %

CONTROL APPARATUS FOR VIBRATION TYPE MOTOR, AND DRIVING APPARATUS

BACKGROUND OF THE INVENTION

Field of the Invention

The present invention relates to a control apparatus for a vibration type motor, and a driving apparatus.

Description of the Related Art

It has conventionally been known that when an amplifier equipped with a resonance circuit is used to drive a vibration type motor such as an ultrasonic motor, voltage and/or current waveforms are distorted according to a driving frequency, and the driving performance and power efficiency lower. Japanese Patent Laid-Open No. ("JP") 2000-70851 discloses a method of converting a driving waveform of an ultrasonic motor into a sine wave using a driving circuit provided with an analog filter and a linear amplifier in order to improve a harmonic distortion caused by a booster circuit. JP 2000-184759 discloses a method of improving a distortion of a driving voltage waveform of an ultrasonic motor by adjusting a pulse width using a switching circuit in order to improve a harmonic distortion caused by a booster circuit.

The method disclosed in JP 2000-70851 is effective in improving the distortion of the driving waveform, but use of the analog filter and the linear amplifier is disadvantageous in terms of the power consumption (power efficiency). The method disclosed in JP 2000-184759 can improve the distortion of the voltage waveform, but cannot improve the distortion of the current waveform.

SUMMARY OF THE INVENTION

The present invention provides a control apparatus for a vibration type motor, and a driving apparatus, each of which can improve a drive performance and power efficiency reduction.

A control apparatus for a vibration type motor according to one aspect of the present invention includes a processor or circuit that serves as a driving signal generating unit configured to generate a driving signal of the vibration type motor; and a booster circuit configured to boost the driving signal. The driving signal generating unit changes a duty ratio of the driving signal based on a driving frequency of the vibration type motor or a current flowing through the vibration type motor. A driving apparatus having the above control apparatus also constitutes another aspect of the present invention.

Further features of the present invention will become apparent from the following description of exemplary embodiments with reference to the attached drawings.

BRIEF DESCRIPTION OF THE DRAWINGS

FIG. 6 illustrates a relationship between a driving frequency and a duty ratio in the first embodiment.

DESCRIPTION OF THE EMBODIMENTS

Referring now to the accompanying drawings, a detailed description will be given of embodiments according to the present invention.

First Embodiment

Referring now to FIGS. 1 to 7C, a description will be given of a control apparatus for a vibration type motor (ultrasonic motor) according to a first embodiment of the present invention. This embodiment will discuss a method of measuring a characteristic of a booster circuit using a step response and of determining a proper duty ratio according to the characteristic of the booster circuit.

Figure 1:
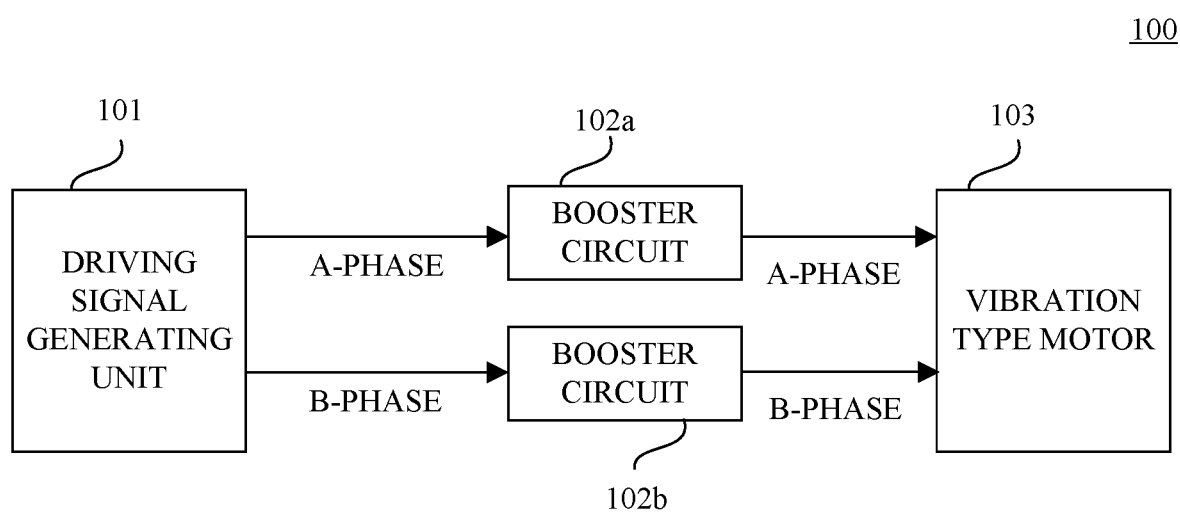
FIG. 1 is a block diagram of a control apparatus for a vibration type motor according to each embodiment.

FIG. 1 is a block diagram of a control apparatus 100 for a vibration type motor. A driving signal generating unit 101 generates a frequency signal (driving signal) for driving piezoelectric elements 222a and 222b in a vibration type motor 103. Booster circuits 102a and 102b boost the voltage (frequency signal generated by the driving signal generating unit 101) applied to the piezoelectric elements 222a and 222b to a voltage necessary for an actuator to operate. The vibration type motor 103 has the piezoelectric elements 222a and 222b, and serves as an actuator by applying a frequency signal to the piezoelectric elements 222a and 222b to vibrate them. The structure and vibration mode of the vibration type motor 103 may use, for example, the same known techniques as those of the vibration type motor described in JPs 2016-218349 and 2017-060279, and a description thereof will be omitted.

This embodiment will discuss a boosting method that combines a boosting method using a transformer and a boosting method using the resonance between the inductance element and the capacitance component of the piezoelectric element.

Figure 2:
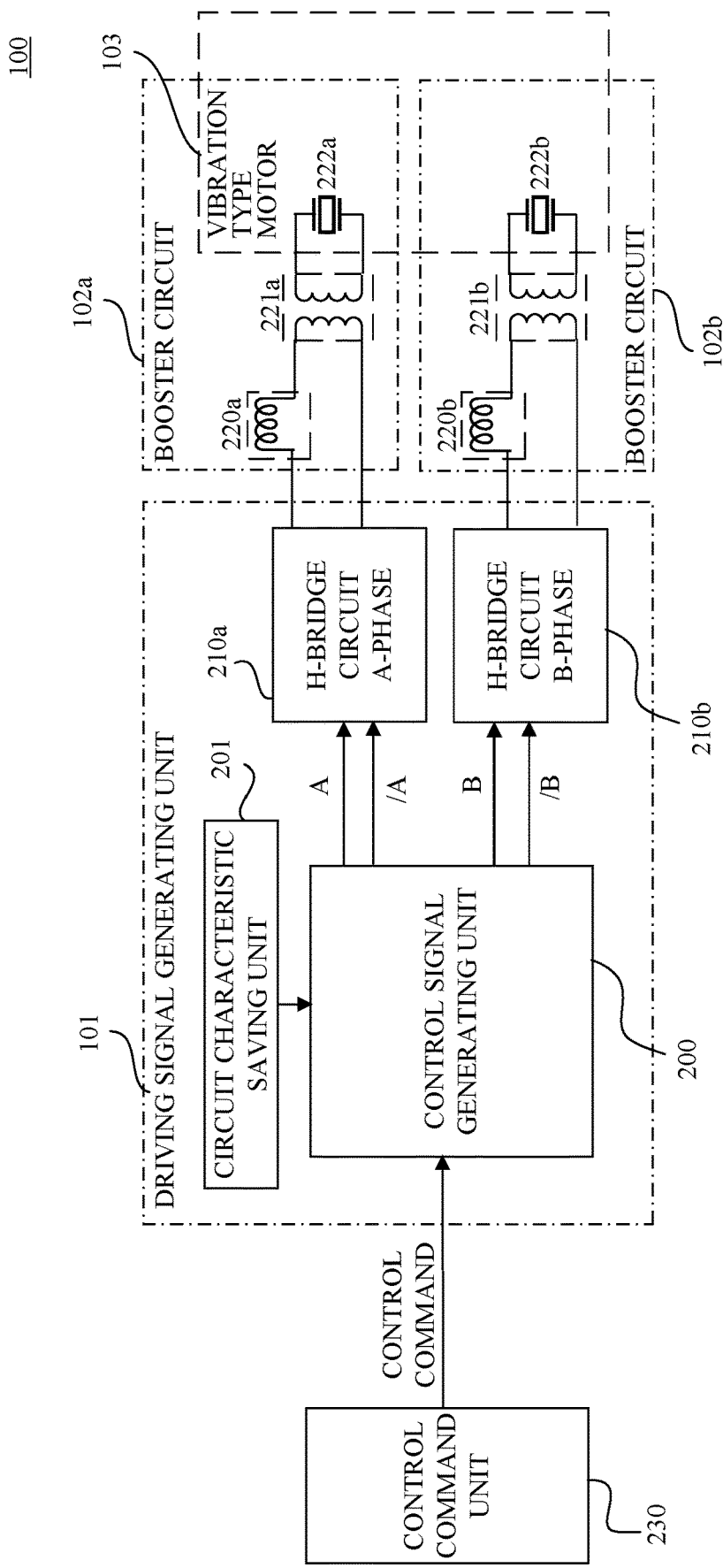
FIG. 2 is a detailed view of the control apparatus for the vibration type motor according to a first embodiment.

FIG. 2 is a detailed view of the control apparatus 100 for the vibration type motor. The driving signal generating unit 101 includes a control signal generating unit 200, a circuit characteristic saving unit (memory) 201, and H-bridge circuits 210a and 210b. The control signal generating unit 200 generates a frequency signal necessary to drive the vibration type motor 103 based on a control command. The circuit characteristic saving unit 201 saves the circuit characteristics such as the resonance period of the booster circuits 102a and 102b.

Figure 3:
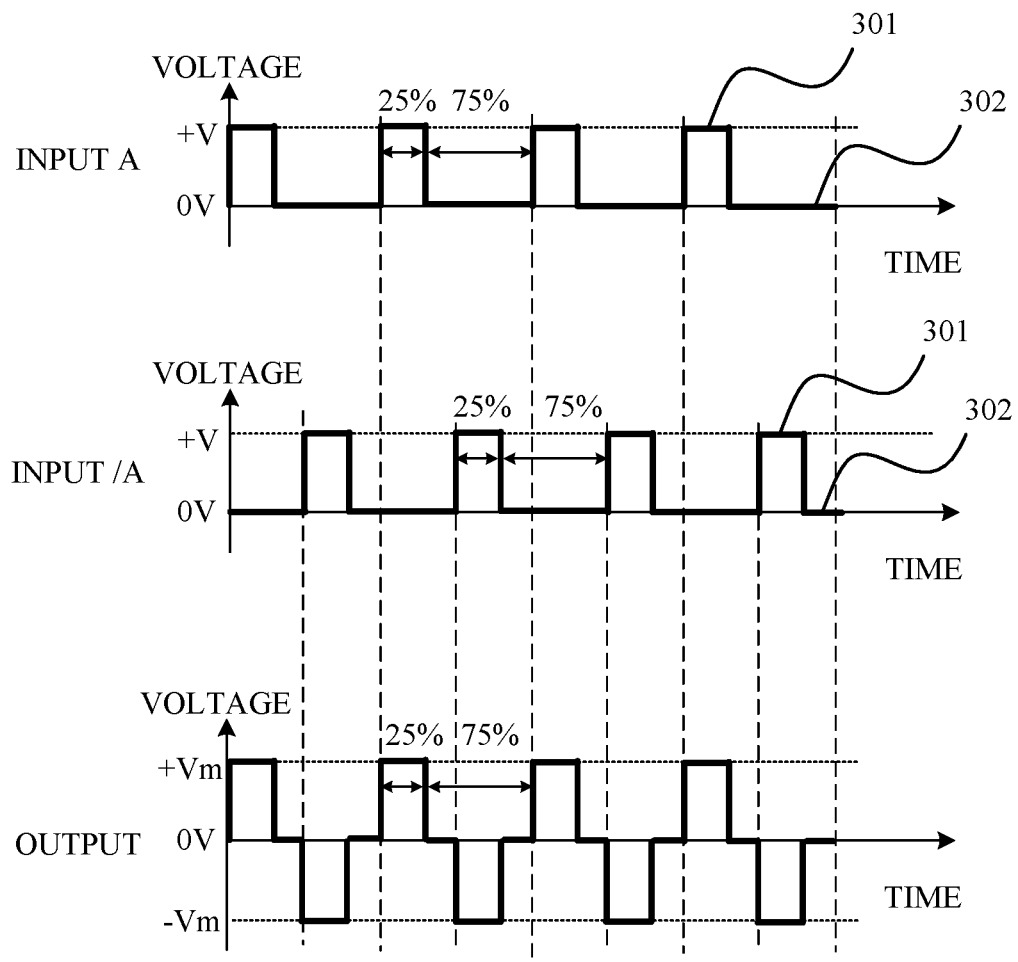
FIG. 3 is an illustrative input/output relationship of an H-bridge circuit according to the first embodiment.

FIG. 3 illustrates an illustrative input/output (I/O) relationship of the H-bridge circuit 210a. When the input A, which is a square wave signal having a duty ratio of 25%, is input to a first input terminal of the H-bridge circuit 210a, and an input/A, which is a square wave signal having a duty ratio of 25%, is input to a second input terminal, a driving signal is generated like the output. The signal input to the first input terminal and the signal input to the second input terminal are signals whose phases shift from each other by 180 degrees. A time period that becomes a high period of the input signal is called Ton time 301, and a time period that becomes a Low period is called Toff time 302.

The booster circuit 102a includes an inductance element 220a, a transformer 221a, and the piezoelectric element 222a of the vibration type motor 103. The booster circuit 102a boosts the signal output from the driving signal generating unit 101 using the transformer 221a and utilizes the resonance between the inductance element 220a and the piezoelectric element 222a to apply a frequency signal of the voltage required to drive the vibration type motor 103. A control command unit 230 issues a driving speed command to control the vibration type motor 103. The booster circuit 102b has an inductance element 220b, a transformer 221b, and the piezoelectric element 222b, and functions in the same manner as the booster circuit 102a.

Figure 4:
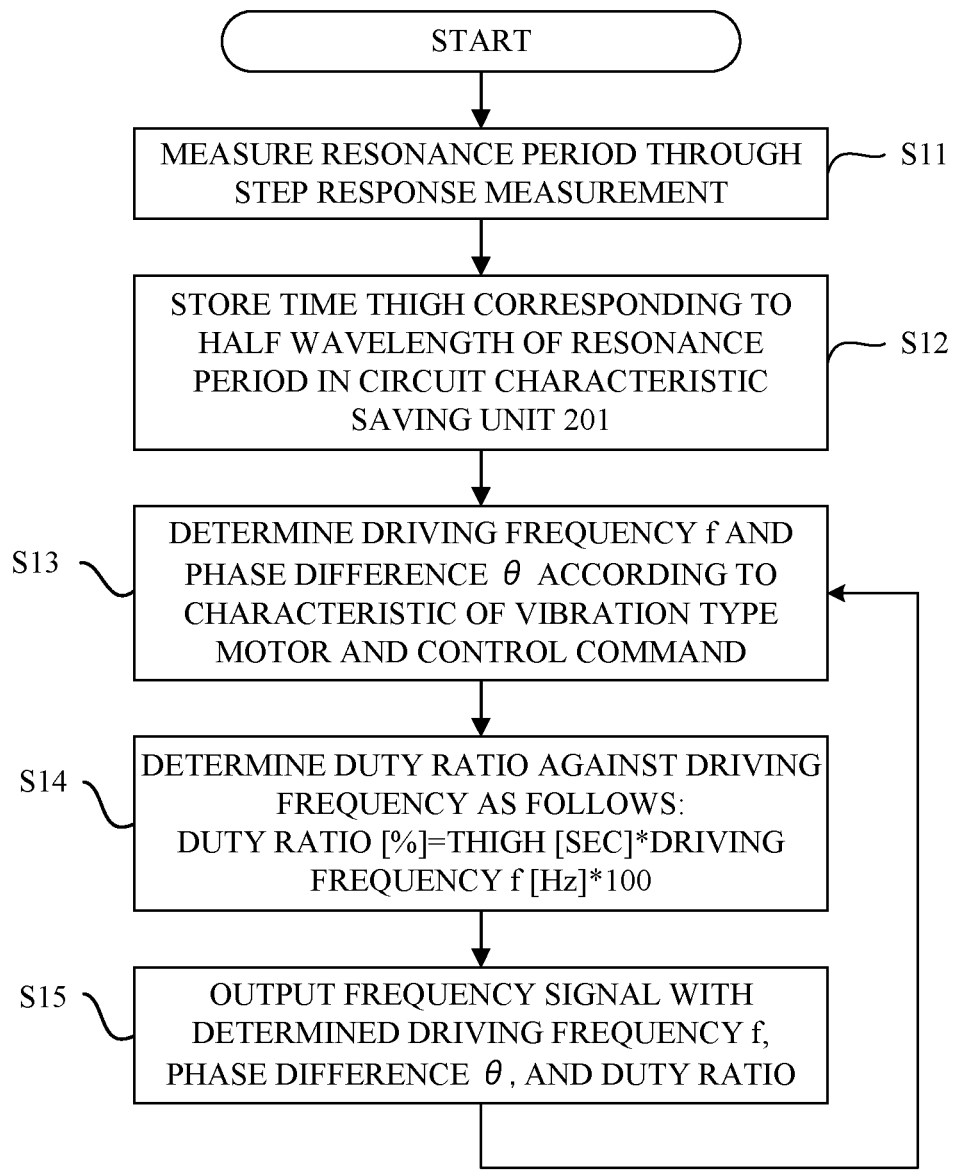
FIG. 4 is a flowchart showing a method of determining a duty ratio according to the first embodiment.
Figure 5:
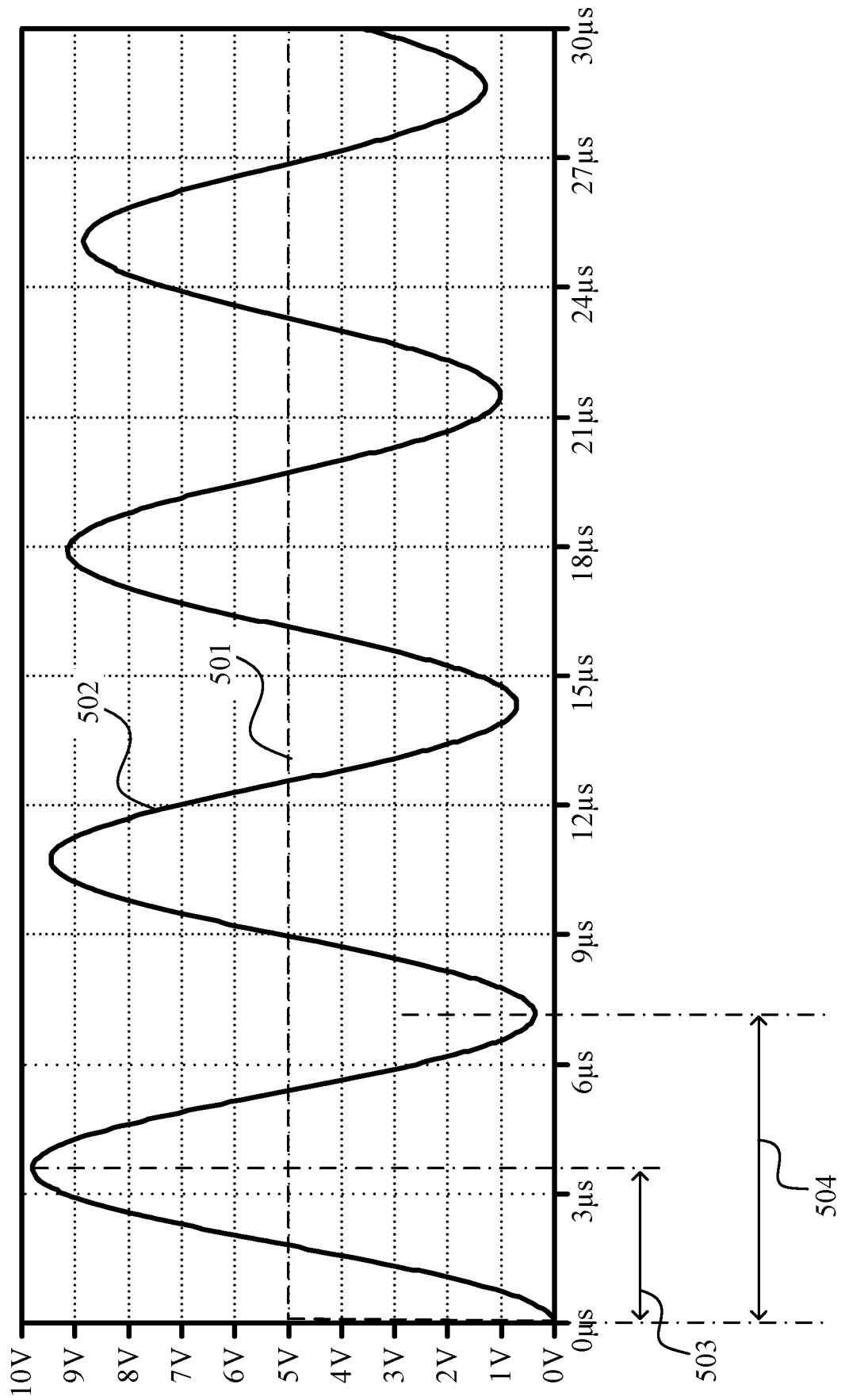
FIG. 5 is an illustrative result obtained by a step response measurement in the first embodiment.

FIG. 4 is a flowchart showing a method of determining the duty ratio according to this embodiment. First, in the step S11, the step response is measured in order to measure the characteristics (resonance characteristics) of the booster circuits 102a and 102b. FIG. 5 is an illustrative result of the step response measurement. When the step input waveform 501 is input to the booster circuits 102a and 102b, a step response waveform 502 is obtained.

The periodic signal applied to use the piezoelectric elements 222a and 222b as a vibration type motor is generally a repetition state of a first wave of the step response waveform 502. A time period from the measurement start time to the peak voltage of the first wave is set to High 503. This is a time period corresponding to approximately half of a resonance period 504 of the step response waveform (half of the resonance period). Since the step response measuring method is known, a description thereof will be omitted. The step response measuring method may use an external device such as an oscilloscope, or an information processing apparatus such as a microcomputer provided with a measurement circuit (not shown) and a control signal generating unit. Although FIG. 5 illustrates the voltage waveform, the current waveform may be measured.

Next, in the step S12 in FIG. 4, the measured High 503 is stored in the circuit characteristic saving unit 201. In actual driving of the vibration type motor 103, in the step S13, the driving signal generating unit 101 determines the driving frequency f and the phase difference Θ in accordance with the control command of the control command unit 230. Next, in the step S14, the driving signal generating unit 101 determines the duty ratio against the driving frequency f as follows:

Duty ratio[%]=Thigh[sec]×driving frequency $f$[Hz]× 100

Next, in the step S15, the control signal generating unit 200 outputs a frequency signal (driving signal) having the determined driving frequency f, phase difference Θ, and duty ratio. In this embodiment, the driving signal generating unit 101 obtains the duty ratio by calculation, but the present invention is not limited to this embodiment and may fix Ton time 301 to High 503. The steps S11 and S12 are performed, for example, in the factory adjustment or power startup, and may not be performed every time.

FIG. 6 illustrates a relationship between the driving frequency and the duty ratio in this embodiment and an illustrative duty ratio selected by the control signal generating unit 200 when the resonance period 504 is, for example, 7.6 μsec.

Figure 7A:
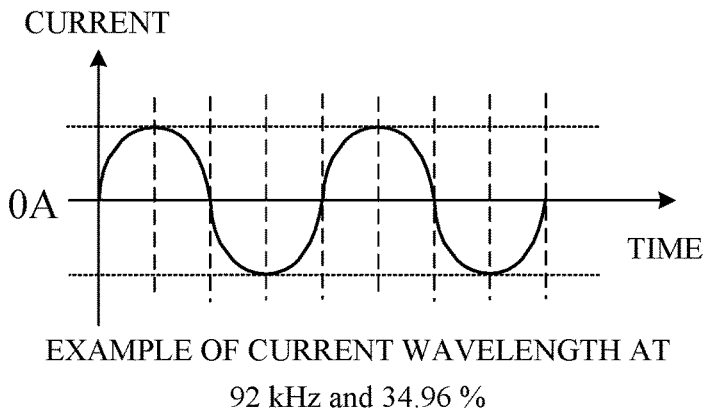
FIGS. 7A to 7C illustrate an example for reducing the current distortion by changing the duty ratio in the first embodiment.
Figure 7B:
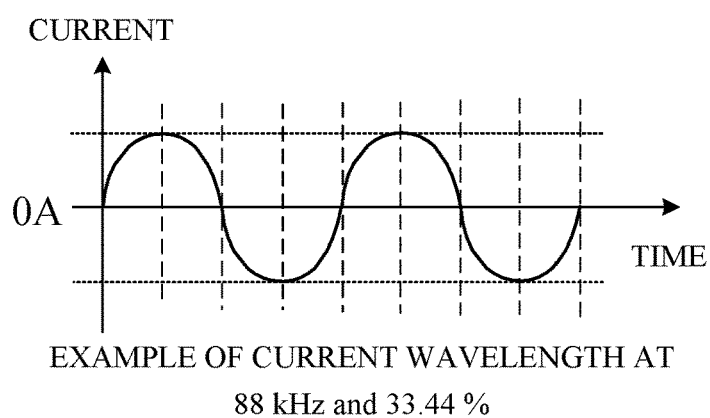
Figure 7C:
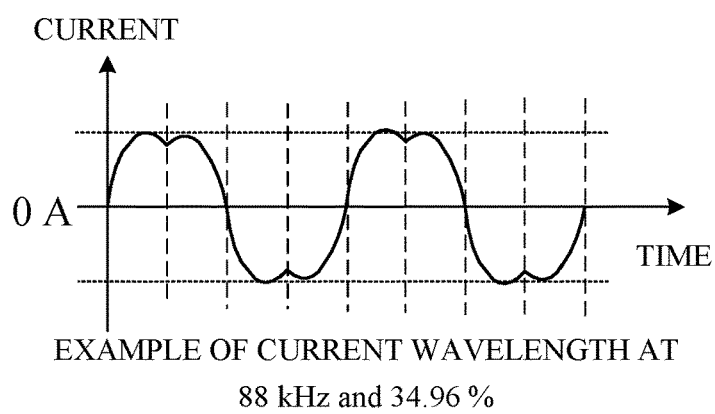

FIGS. 7A and 7B illustrate an example for reducing the current distortion by changing the duty ratio according to this embodiment and secondary side current waveforms of the transformers 221a and 221b observed when the driving frequency and the duty ratio are changed as illustrated in FIG. 6 in response to the speed command from the control command unit 230. FIG. 7A illustrates an example when the driving frequency is 92 kHz, and FIG. 7B illustrates an example when the driving frequency is 88 kHz. FIG. 7C is a comparative example where the duty ratio is 34.96%, which is a value when the driving frequency is 92 kHz and the driving frequency is 88 kHz, and the distortion of the current waveform is larger than that in this embodiment.

This embodiment discusses an example in which the resonance period of the booster circuits 102a and 102b is saved in the circuit characteristic saving unit 201 and the duty ratio is calculated by the control signal generating unit 200, but the duty ratio may be adjustable based on the driving frequency.

This embodiment measures the resonance characteristics of the booster circuits 102a and 102b through the step response measurement, but another measurement method or a previously calculated theoretical value may be used. Since the resonance characteristic may change depending on the temperature or the like, the duty ratio may be adjusted after the temperature is corrected with the temperature corrector. The input waveform may be generated in a pseudo manner using a higher frequency, and this embodiment is widely applicable to the frequency for driving the vibration type motor.

Thus, the control apparatus generates the driving waveform of the vibration type motor using the booster circuit, and properly adjusts the duty ratio of the driving signal of the vibration type motor. That is, the driving signal generating unit changes the duty ratio of the driving signal based on the driving frequency of the vibration type motor. The driving signal generating unit may set the duty ratio to a first duty ratio when the driving frequency is a first driving frequency, and may set the duty ratio to a second duty ratio higher than the first duty ratio when the driving frequency is a second driving frequency higher than the first driving frequency. The driving signal generating unit may set the duty ratio so as to reduce or minimize the current distortion of the current waveform of the vibration type motor. The driving signal generating unit may set the duty ratio so as to make closer the current waveform of the vibration type motor to a sine wave. The driving signal generating unit may determine the duty ratio based on a period corresponding to half of the resonance period of the booster circuit. The control apparatus for the vibration type motor may further includes a memory (circuit characteristic saving unit 201) that stores a period corresponding to half of the resonance period, and the driving signal generating unit determines the duty ratio based on the period (High 503) corresponding to the half of the resonance period and the driving frequency. In this embodiment, the driving signal corresponds to a frequency signal for driving the piezoelectric element in the vibration type motor. Thereby, the current distortion in the piezoelectric elements 222a and 222b can be improved and the power efficiency can be improved.

Second Embodiment

Referring now to FIGS. 8 to 10C, a description will be given of a control apparatus for a vibration type motor according to a second embodiment of the present invention. This embodiment improves the current distortion by detecting the current flowing through the vibration type motor using the current detecting circuit, by reducing the duty ratio when the current obtained by the current detection circuit is larger than a sine waveform, and by increasing the duty ratio when it is smaller than the sine waveform.

Figure 8:
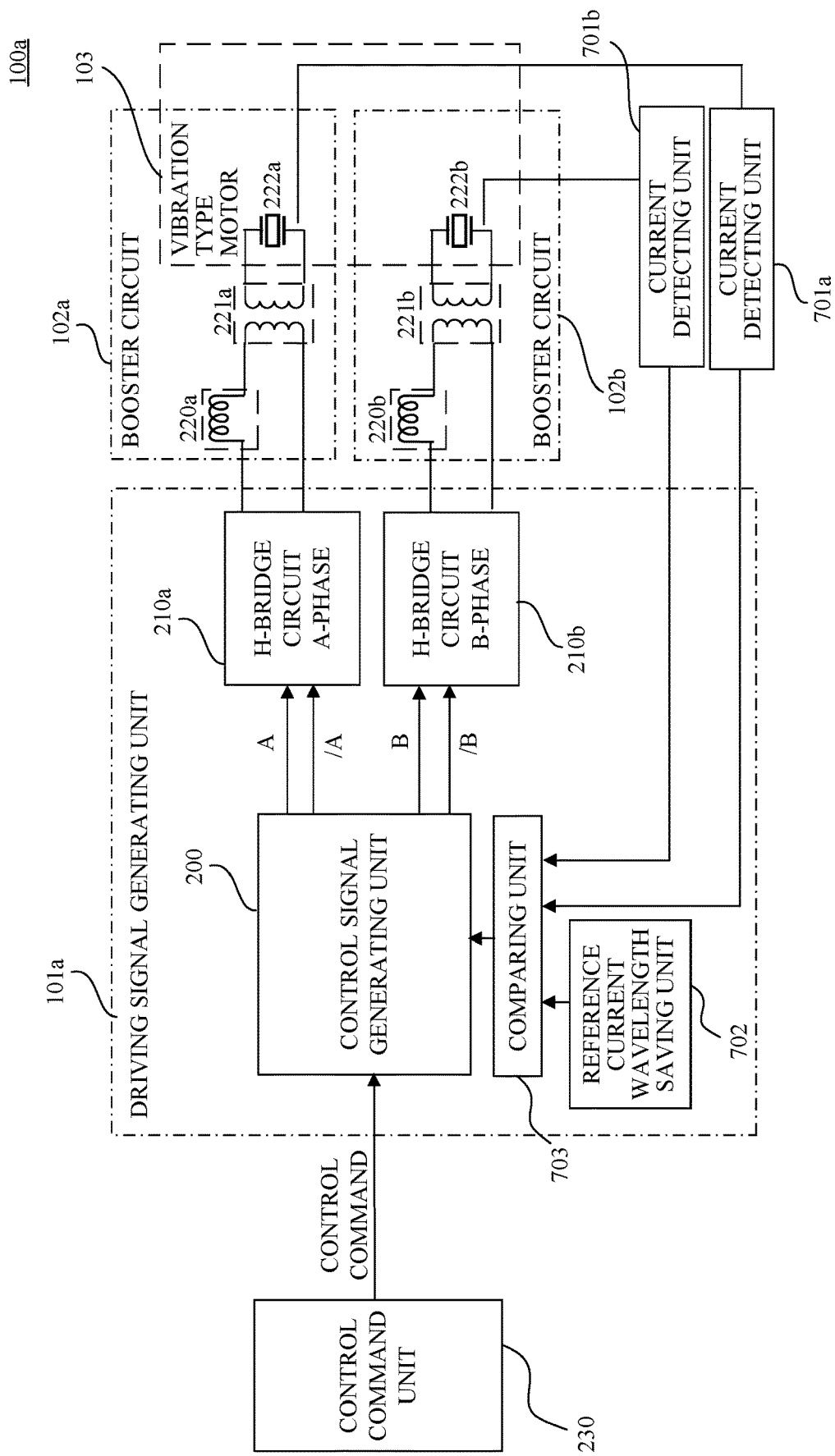
FIG. 8 is a detailed view of a control apparatus for a vibration type motor according to a second embodiment.

FIG. 8 is a detailed view of a control apparatus 100a for the vibration type motor according to this embodiment. A driving signal generating unit 101a includes a control signal generating unit 200, a reference current waveform saving unit 702, a comparing unit 703, and H-bridge circuits 210a and 210b. The control signal generating unit 200 generates a frequency signal (driving signal) necessary to drive the vibration type motor 103 based on a control command. The booster circuit 102a includes an inductance element 220a, a transformer 221a, and a piezoelectric element 222a of the vibration type motor 103.

The booster circuit 102a boosts the signal output from the driving signal generating unit 101a through the transformer 221a and utilizes the resonance between the inductance element 220a and the piezoelectric element 222a to apply a frequency signal of the voltage necessary to drive the vibration type motor 103. The booster circuit 102b includes an inductance element 220b, a transformer 221b, and a piezoelectric element 222b, and has the same function as the booster circuit 102a. The current detecting units 701a and 701b detect the current flowing through the vibration type motor 103. The comparing unit 703 compares the current (measured current) detected by the current detecting units 701a and 701b with the reference current saved by the reference current waveform saving unit 702. The control command unit 230 issues a driving speed command to control the vibration type motor 103.

Figure 9:
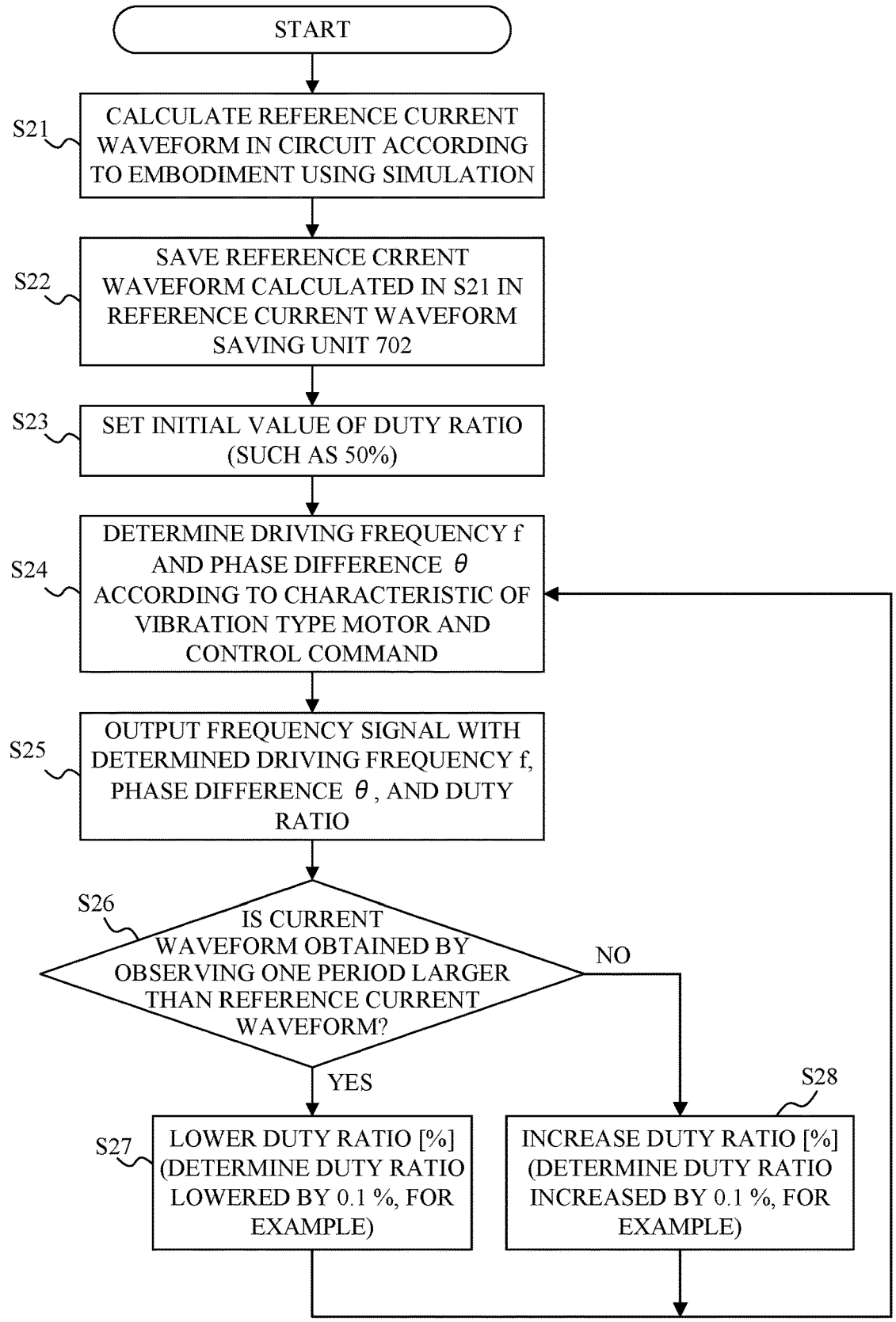
FIG. 9 is a flowchart showing a method of determining a duty ratio according to the second embodiment.

FIG. 9 is a flowchart showing a method of determining the duty ratio according to this embodiment. First, in the step S21, a simulation is performed to calculate a theoretical current waveform of the booster circuits 102a and 102b. Since the method of solving the circuit is known, a description thereof will be omitted. Next, in the step S22, the simulation result of the step S21 is stored as a reference current (reference current waveform) in the reference current waveform saving unit 702. Next, in the step S23, the driving signal generating unit 101a sets an initial value of the duty ratio. Next, in the step S24, in driving the vibration type motor 103, the driving signal generating unit 101a determines the driving frequency f and the phase difference Θ based on the control command from the control command unit 230. Next, in the step S25, the driving signal generating unit 101a outputs a frequency signal (driving signal) for driving the vibration type motor 103.

Next, in the step S26, the driving signal generating unit 101a adjusts the duty ratio based on the result of driving the vibration type motor 103 with the frequency signal output in the step S25. In this embodiment, the comparing unit 703 observes, for example, a current waveform of one cycle (current waveform detected by the current detecting units 701a and 701b (actually measured current waveform)) and determines whether or not it is larger than the reference current waveform. If the current waveform of one cycle is larger than the reference current waveform, the flow proceeds to the step S27. In the step S27, the driving signal generating unit 101a decreases the duty ratio. For example, when the duty ratio is lowered by 0.1%, the duty ratio for the next one cycle becomes 49.9%. On the other hand, if the current waveform of one cycle is smaller than the reference current waveform in the step S26, the flow proceeds to the step S28. In the step S28, the driving signal generating unit 101a increases the duty ratio. For example, when the duty ratio is increased by 0.1%, the duty ratio for the next one cycle becomes 50.1%. The determination criteria may be, for example, compared by the size obtained by integrating one cycle, or may be compared for each sampling.

Figure 10A:
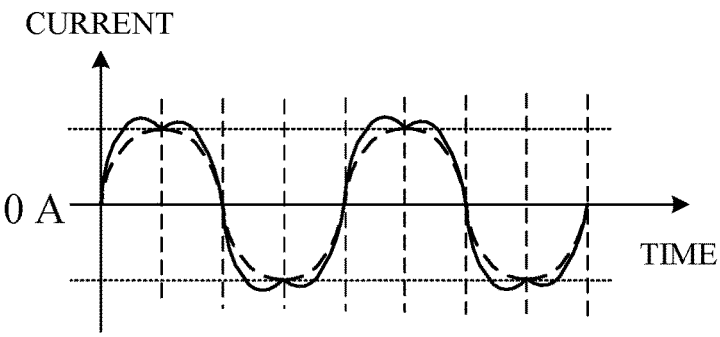
FIGS. 10A to 10C illustrate an example of a reference current waveform and an actually measured current waveform according to the second embodiment.
Figure 10B:
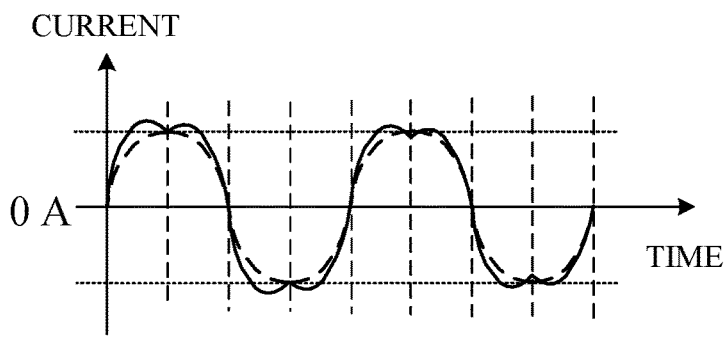
Figure 10C:
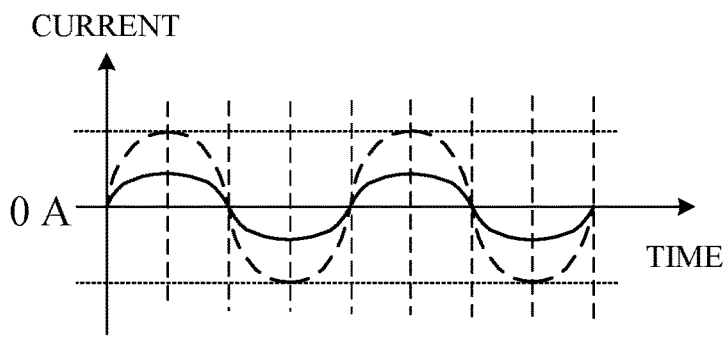

FIGS. 10A to 10C illustrate examples of the reference current waveform and the actually measured current waveform. FIGS. 10A to 10C illustrate examples of the reference current waveform stored in the reference current waveform saving unit 702 and the current waveforms measured by the current detecting units 701a and 701b, which are compared with each other by the comparing unit 703. A broken line indicates the reference current waveform, and a solid line indicates the measured current waveform, respectively. FIGS. 10A and 10B illustrate an example in which the measured current waveform is larger than the reference current waveform. FIG. 10C illustrates an example in which the measured current waveform is smaller than the reference current waveform. FIG. 10A illustrates an example in which the measured current waveform is always larger than the reference current waveform, and FIG. 10B illustrates an example in which the measured current waveform is smaller than the reference current waveform in part of the period.

In this embodiment, the measurement results at two measurement points of the vibration type motor 103 are the same using the two current detecting units 701a and 701b, but the measurement results at the two measurement points may be different. In that case, an average value of the two measurement results may be used or a value of one of the measurement results may be preferentially adopted. This embodiment uses two current detecting units, but the measurement results at one measurement point may be used by using only one current detecting unit.

Thus, the control apparatus generates the driving waveform of the vibration type motor using the booster circuit, and properly adjusts the duty ratio of the driving signal of the vibration type motor using the current detecting unit. That is, the driving signal generating unit changes the duty ratio of the driving signal based on the current flowing through the vibration type motor. The control apparatus for the vibration type motor may include a current detecting unit that detects the current flowing through the vibration type motor, and a comparing unit that compares the current detected by the current detecting unit with the reference current. The driving signal generating unit may determine the duty ratio based on the comparison result between the current and the reference current by the comparing unit. The driving signal generating unit may lower the duty ratio when the current is larger than the reference current and increase the duty ratio when the current is smaller than the reference current. Thereby, the current distortion of the piezoelectric elements 222a and 222b can be improved and the power efficiency can be improved.

The control apparatus for the vibration type motor according to each embodiment properly adjusts the duty ratio based on the driving frequency and the current value of the driving signal of the vibration type motor, and thereby improves the current distortion of the piezoelectric element. Thus, each embodiment can provide a control apparatus for a vibration type motor that can improve a decrease in driving performance and power efficiency.

The control apparatus for the vibration type motor according to each embodiment is applicable to various driving apparatus. An illustrative driving apparatus that includes a control apparatus for a vibration type motor, the vibration type motor, and a driven member to be driven by the vibration type motor is an optical apparatus such as a lens apparatus having a lens as the driven member, or an image pickup apparatus that includes an imaging direction changing member as the driven member, and an industrial apparatus such as a stage apparatus that includes a stage mounted with a moving object as the driven member, or a robot arm that includes an arm or a finger as the driven member.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-132101, filed on Aug. 4, 2020, which is hereby incorporated by reference herein in its entirety.

What is claimed is:

1. A control apparatus for a vibration type motor, the control apparatus comprising:
   a processor or circuit that serves as a driving signal generating unit configured to generate a driving signal of the vibration type motor; and
   a booster circuit configured to boost the driving signal, wherein the driving signal generating unit sets a duty ratio to a first duty ratio when a driving frequency of the vibration type motor is a first driving frequency, and sets the duty ratio to a second duty ratio higher than the first duty ratio when the driving frequency is a second driving frequency higher than the first driving frequency, and
   wherein at the second driving frequency, a current distortion of a current waveform of the vibration type motor is smaller when the duty ratio is set to the second duty ratio than when the duty ratio is set to the first duty ratio.

2. The control apparatus for the vibration type motor according to claim 1, wherein the driving signal generating unit sets the duty ratio so as to make closer a current waveform of the vibration type motor to a sine wave.

3. The control apparatus for the vibration type motor according to claim 1, wherein the driving signal generating unit determines the duty ratio based on a period corresponding to half of a resonance period of the booster circuit.

4. The control apparatus for the vibration type motor according to claim 3, further comprising a memory configured to store the period corresponding to the half of the resonance period,
   wherein the driving signal generating unit determines the duty ratio based on the period and the driving frequency.

5. The control apparatus for the vibration type motor according to claim 1, wherein the driving signal corresponds to a frequency signal given to a piezoelectric element in the vibration type motor.

6. The control apparatus for the vibration type motor according to claim 1, wherein the control apparatus applies the driving signal boosted by the booster circuit to the vibration type motor.

7. A control apparatus for a vibration type motor, the control apparatus comprising:
   a processor or circuit that serves as a driving signal generating unit configured to generate a driving signal of the vibration type motor; a current detecting unit configured to detect a current flowing through the vibration type motor; and a comparing unit configured to compare the current detected by the current detecting unit with a reference current; and
   a booster circuit configured to boost the driving signal,
   wherein when the current is larger than the reference current, the driving signal generating unit lowers a predetermined duty ratio of the driving signal to a first duty ratio,
   wherein when the current is smaller than the reference current, the driving signal generating unit increases the predetermined duty ratio to a second duty ratio,
   wherein when the current is larger than the reference current, a current distortion of a current waveform of the vibration type motor is smaller when the duty ratio is set to the first duty ratio than when the duty ratio is set to the predetermined duty ratio, and
   wherein when the current is smaller than the reference current, the current distortion of the current waveform is smaller when the duty ratio is set to the second duty ratio than when the duty ratio is set to the predetermined duty ratio.

8. The control apparatus for the vibration type motor according to claim 7, wherein the control apparatus applies the driving signal boosted by the booster circuit to the vibration type motor.

9. A driving apparatus comprising:
   a vibration type motor;
   a driven member to be driven by the vibration type motor;
   a processor or circuit that serves as a driving signal generating unit configured to generate a driving signal of the vibration type motor; and
   a booster circuit configured to boost the driving signal, the driving signal boosted by the booster circuit being applied to the vibration type motor,
   wherein the driving signal generating unit sets a duty ratio to a first duty ratio when a driving frequency of the vibration type motor is a first driving frequency, and sets the duty ratio to a second duty ratio higher than the first duty ratio when the driving frequency is a second driving frequency higher than the first driving frequency, and wherein at the second driving frequency, a current distortion of a current waveform of the vibration type motor is smaller when the duty ratio is set to the second duty ratio than when the duty ratio is set to the first duty ratio.

10. The driving apparatus according to claim 9, wherein the driving apparatus is a lens apparatus, and the driven member is a lens.

11. The driving apparatus according to claim 9, wherein the driving apparatus is an image pickup apparatus, and the driven member is an imaging direction changing member.

12. The driving apparatus according to claim 10, wherein the driving apparatus is a lens apparatus, and the driven member is a lens.

13. The driving apparatus according to claim 10, wherein the driving apparatus is an image pickup apparatus, and the driven member is an imaging direction changing member.

14. A driving apparatus comprising:

a vibration type motor;

a driven member to be driven by the vibration type motor;

a processor or circuit that serves as a driving signal generating unit configured to generate a driving signal of the vibration type motor; a current detecting unit configured to detect a current flowing through the vibration type motor; and a comparing unit configured to compare the current detected by the current detecting unit with a reference current; and a booster circuit configured to boost the driving signal, the driving signal boosted by the booster circuit being applied to the vibration type motor, wherein when the current is larger than the reference current, the driving signal generating unit lowers a predetermined duty ratio of the driving signal to a first duty ratio, wherein when the current is smaller than the reference current, the driving signal generating unit increases the predetermined duty ratio to a second duty ratio, wherein when the current is larger than the reference current, a current distortion of a current waveform of the vibration type motor is smaller when the duty ratio is set to the first duty ratio than when the duty ratio is set to the predetermined duty ratio, and wherein when the current is smaller than the reference current, the current distortion of the current waveform is smaller when the duty ratio is set to the second duty ratio than when the duty ratio is set to the predetermined duty ratio.

* * * * *